Figure 1:
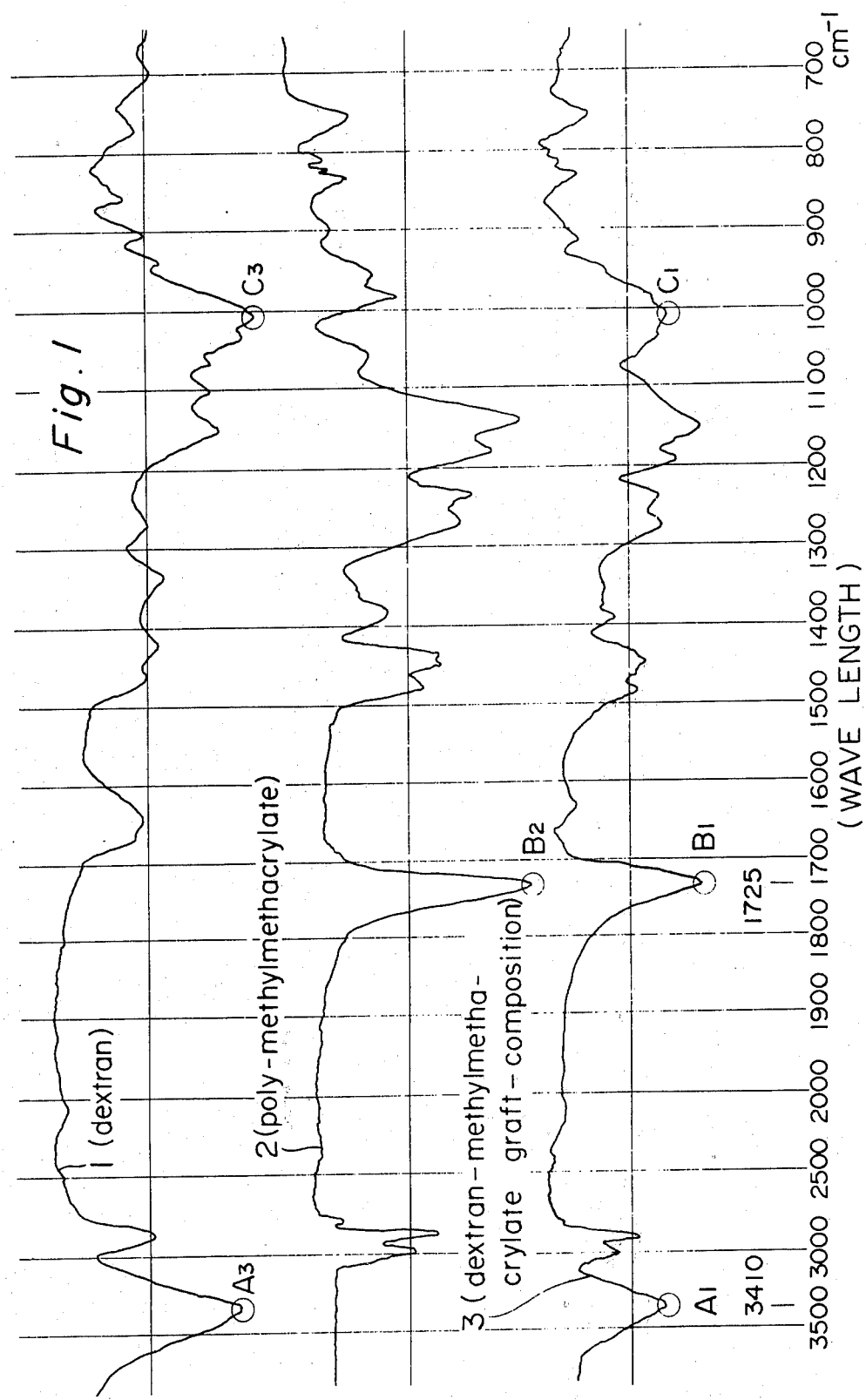

United States Patent [19]
Kamiya et al.

[11] 3,989,656
[45] Nov. 2, 1976

[54] DEXTRAN-ALKYL METHACRYLATE GRAFT COMPOSITION FOR CONTACT LENS AND CORNEAS

[75] Inventors: Sadayoshi Kamiya; Tokihiko Yamamoto; Yasuhiko Onishi; Shusaburo Hokkoku, all of Nagoya, Japan

[73] Assignee: Karme Company Ltd., Nagoya, Japan

[22] Filed: Jan. 6, 1975

[21] Appl. No.: 539,151

Related U.S. Application Data
[63] Continuation of Ser. No. 376,183, July 3, 1973, abandoned.

[30] Foreign Application Priority Data
July 6, 1972  Japan.............................. 47-67965
Mar. 8, 1973  Japan.............................. 48-27275

[52] U.S. Cl. ....................... 260/17.4 GC; 351/160; 351/174
[51] Int. Cl.² ............................................ C08L 5/02
[58] Field of Search ............. 260/17.4 GC, 17.4 SG; 351/160, 174

[56] References Cited
UNITED STATES PATENTS
3,081,143  3/1963  Segro .................. 260/17.4
3,635,857  1/1972  Restaino et al. .................... 260/17.4

Primary Examiner—Donald E. Czaja
Assistant Examiner—Edward Woodberry
Attorney, Agent, or Firm—Sherman & Shalloway

[57] ABSTRACT

A dextran-alkyl methacrylate graft composition consisting essentially of a dextran unit of the formula (1)

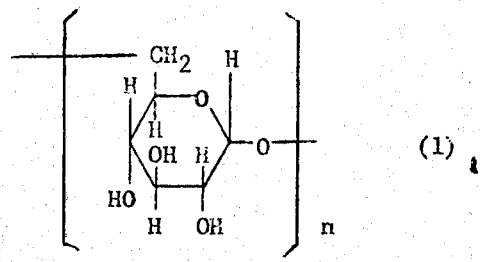

wherein $n$ is an integer of 5 to 150,000, and a poly(alkyl methacrylate) unit of the formula (2)

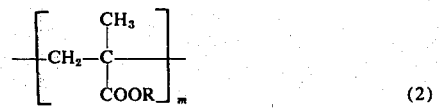

wherein $m$ is an integer of 50 to 200,000 and R is an alkyl group having 1 to 4 carbon atoms, and a process for producing the same.

5 Claims, 2 Drawing Figures

Fig. 1

DEXTRAN-ALKYL METHACRYLATE GRAFT COMPOSITION FOR CONTACT LENS AND CORNEAS

This is a continuation of application Ser. No. 376,183, filed July 3, 1973 and now abandoned.

This invention relates to a novel water- and acetone-insoluble dextran-alkyl methacrylate graft composition or graft copolymer capable of giving shaped articles having excellent shapeability, surface wetting property and transparency.

More specifically, this invention relates to a dextranalkyl methacrylate graft composition consisting essentially of a dextran unit of the following formula (1)

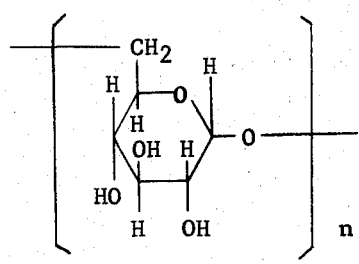

wherein $n$ is an integer of 5 to 150,000, preferably 10 to 50,000,
and poly(alkyl methacrylate) unit of the following formula (2)

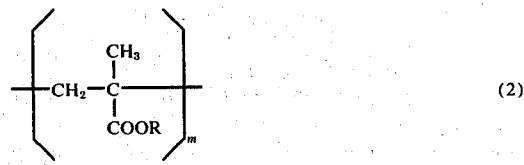

wherein $m$ is an integer of 50 to 200,000 and R is an alkyl group having 1 to 4 carbon atoms; and
to a process for preparing said composition.

A graft composition formed between acrylic acid or methacrylic acid and cellulose or starch of the type in which the constituent glucose units are bonded mainly at the 1-4-position has been previously known. However, since shaped articles of the cellulose-methacrylic monomer graft composition are not satisfactory in wetting properties and transparency, their utility is greatly restricted. Furthermore, shaped articles of the starch-methacrylic monomer graft composition are brittle and have defects in strength and viscoelasticity. Aslo, they have poor wetting properties, and the utility of the composition is greatly restricted.

There was reported a graft composition of acrylic acid and a 4-β-hydroxyethylsulfonyl-2-aminoanisole ether of a dextran of the type in which the constituent glucose units are bonded at the α-1-6-position such as shown in formula (1), a graft composition of polyacryl hydrazide and the above dextran, and a graft composition of the above dextran and polyacrylhydroxamic acid (A. D. Virmik, O. P. Laletina, M. A. Penenzhik, K. P. Khomiakov, Z. A. Rogovin, and G. Ya. Rosenberg, "High-Molecular Compounds", A. 10, 362 (1968). Since this graft composition is water-soluble as is disclosed in the above report, its utility is extremely limited.

It has now been found that a novel dextranalkyl methacrylate graft composition composed of the units (1) and (2) described above can be produced easily, and this composition can give shaped articles of superior surface wetting properties and transparency, has superior shapeability suitable for use in such fields as contact lenses or artificial organs and superior water resistance and resistance to body liquids, and is free from interaction with living tissues. It has also been found that the resulting composition has superior shapability shown by bending strength, the amount of flexure and Vicat softening point, tensile strength, surface wettability and transparency and is insoluble in water and acetone.

Accordingly, an object of this invention is to provide a novel dextran-alkyl methacrylate graft composition.

Another object of this invention is to provide a process for producing the above dextran composition.

Many other objects and advantages of this invention will become more apparent from the following description.

The dextran-alkyl methacrylate graft composition of this invention consisting essentially of the dextran units of the above formulae (1) and (2) can be obtained by reacting dextran with an alkyl methacrylate having 1 to 4 carbon atoms in the alkyl group in the presence of a redox catalyst in the absence of molecular oxygen. This graft polymerization reaction can be performed either in solution, emulsion or suspension. A part or whole of the above redox catalyst may be replaced by a peroxide catalyst or a diazo compound catalyst. If desired, the use of the catalyst compound may be omitted, and the materials may be heat polymerized under the suspending or emulsifying conditions. Or the use of the catalyst compound may be omitted, and ozone is introduced into an aqueous solution of dextran, after which the reaction system is heated and the oxidized dextran is graft polymerized with an alkyl methacrylate under the suspending or emulsifying conditions. Furthermore, it is also possible to polymerize the materials in solution by applying actinic radiation such as γ rays, X-rays, electron rays or ultraviolet rays. Where graft polymerization is carried out using a redox catalyst, solution polymerization may be employed using a solvent which can dissolve both the dextran and the alkyl methacrylate, such as dimethyl formamide or dimethyl sulfoxide. Alternatively, the materials may be polymerized in emulsion in the presence of a basic, neutral or acidic surface active agent, preferably the neutral surfactant such as higher alkyl ethers of polyethylene glycol, in an aqueous medium. Or they may be polymerized in suspension by omitting the use of surfactants. At this time, the presence of molecular oxygen reduces the activity of the redox catalyst, and therefore, the reaction is desirably carried out after purging the liquid reaction medium and the reaction zone with nitrogen. The pH of the reaction system is not more than 6, preferably not more than 3 under acidic conditions. It is not necessary to use a reducing component conjointly with the redox catalyst used, and a tetravalent cerium compound or a pentavalent vanadium compound can be preferably utilized as the redox catalyst. Examples of such a cerium compound are cerium ammonium nitrate, cerium sulfate, cerium ammonium sulfate, cerium nitrate, and cerium ammonium pyrophosphate. Furthermore, a compound capable of forming the above compounds under acidic conditions during the polymerization reaction, such as ceriumhydroxide, can also be used. As the above vanadium compound, vanadic acid can be exemplified. The reaction can be performed at room temperature, and temperatures within a range of 0° to 75° C. are generally employed.

When a peroxide catalyst or a diazo compound catalyst is used instead of the redox catalyst, the presence of molecular oxygen does not cause a disadvantage, and temperatures ranging from room temperature to 100° C. can be employed. Specific examples of these catalysts are peracids such as hydrogen peroxide, persulfuric acid, peracetic acid or perbenzoic acid, alkylhydro- or dialkyl-peroxides with a $C_1$–$C_4$ alkyl group such as tertiary butyl hydroperoxide, methylhydroperoxide, diisopropyl peroxide or ditertiary butyl peroxide, and azo compounds such as benzene diazonium chloride, N-nitroso acetanilide or diazo thioether.

When actinic radiation is utilized, its application is carried out at room temperature under conditions which ensure the intimate contact of dextran with the alkyl methacrylate. Radiation can be applied to dextran prior to contact with the alkyl methacrylate.

When the catalyst is utilized, the concentrations of the dextran, alkyl methacrylate and catalyst based on the total volume of the reaction system can be varied freely. For example, the preferred dextran concentration is 0.6 to 20 weight/volume %, the concentration of the methacrylate 1 to 30 weight/volume %, and the catalyst concentration $5.5 \times 10^{-3}$ to $11 \times 10^{-1}$ mol/liter.

Where the redox catalyst is used, it may be deactivated after reaction by using a deactivating agent such as hydroquinone, sodium sulfate or ferrous sulfate. When graft polymerization is carried out using a catalyst, the reaction product is precipitated using an alcohol, and the resulting precipitate is treated with hot water to remove the unreacted dextran. The by-product polymethacrylate may be removed with a solvent such as acetone, tetrahydrofuran, dimethyl formamide, ethyl acetate or chloroform.

Examples of the alkyl group of the alkyl methacrylate are methyl, ethyl, propyl and butyl, the methyl being especially preferred.

The ratio of the unit of formula (1) to the unit of formula (2) in the dextran/alkyl methacrylate graft composition can be freely chosen. The ratio of the formula (2) unit/formula (1) unit is preferably 50 to 3000 % by weight.

The dextran-alkyl methacrylate graft composition of this invention is insoluble in water and acetone at 25° C. In view of the fact that dextran is soluble in water at 25° C. and poly (alkyl methacrylate) is soluble in acetone at 25° C., it is evident that the dextran-alkyl methacrylate graft composition of graft copolymer of this invention is not a mixture of dextran and poly(alkyl methacrylate).

Furthermore, the dextran-alkyl methacrylate graft composition of this invention has a glass transition point and a softening initiation point which are not possessed by dextran. This glass transition temperature is far higher than that of poly (alkyl methacrylate).

For example, when a copolymer of dextran and methyl methacrylate shown in Example 1 to be given below is examined by differential thermal analysis, it is seen that its glass transition point appears at 180° C., and at about 275° C., a marked softening phenomenon (endothermic reaction) occurs.

On the other hand, differential thermal analysis of dextran having an intrinsic viscosity of 0.222 shows that it does not have a glass transition point and a softening initiation point, but is merely heat decomposed. Furthermore, differential thermal analysis of poly(methyl methacrylate) alone obtained by separating from the copolymer of Example 1 shows that its glass transition point appears at 130° C., and it begins to soften at 270° C.

The results of these analyses are shown in Table 1 below.

Table 1

|  | Glass transition point (° C) | Softening initiation point (° C) |
|---|---|---|
| Copolymer of dextran and methyl methacrylate | 180 | 275 |
| Poly (methyl methacrylate) | 130 | 270 |
| Dextran | — | — |

The infrared spectrum charts of the dextran-methyl methacrylate graft composition of this invention, dextran and poly (methyl methacrylate) are shown in FIG. 1. Line 1 refers to dextran, line 2 to poly (methyl methacrylate), and line 3 to the dextran-methyl methacrylate graft composition.

As is shown in FIG. 1, in the graft composition of this invention, an absorption $A_1$ appears in the vicinity of 3410 cm$^{-1}$ which corresponds to an absorption $A_3$ ascribable to the stretching vibration of —OH of the dextran, an absorption $B_1$ appears in the vicinity of 1725 cm$^{-1}$ which corresponds to an absorption $B_2$ ascribable to the carbonyl group >C=O of the polymethacrylate, and an absorption $C_1$ appears in the vicinity of 1000 to 1150 cm$^{-1}$ which corresponds to an absorption $C_3$ ascribable to the pyranose ring of dextran.

Thus, the dextran-alkyl methacrylate graft composition of this invention exhibits different solubility and thermal properties from dextran and poly (alkylmethacrylate), and shows the above-described characteristic absorptions in infrared absorption spectrum. From this fact, it is judged that the graft composition of this invention is a novel compound graft polymerized in the same way as in a cellulose or starch and an acrylic monomer, and is not a mixture of dextran and poly(alkyl methacrylate).

The dextran-alkyl methacrylate graft composition of this invention is melt-shapeable, and may be in various forms such as powder, granules, pellets, flakes, filaments, films, sheets or tubes. Furthermore, the shaped articles made therefrom may be of such forms as can be used for various applications. For instance, the composition of this invention can be shaped into contact lenses to exhibit its excellent wetting properties and transparency. Such contact lenses are well wettable with water and tears, and have low water absorbability as in the conventional contact lens material [poly(methyl methacrylate) resin] and mechanical and optical characteristics resembling those of the poly (methyl methacrylate) resin. Thus, this invention provides a contact lens which may be worn by persons who suffer from discomforts such as blood shot eyes, burning feelings in the eyes, and foggy views when provided with conventional contact lenses.

In the formation of the graft composition of this invention into a contact lens, the composition is placed in a mold and heated, and by pressing the mold using a press device, it is shaped into a sheet or rod form. The heating temperature employed at this time is preferably 170° to 230° C., and the pressure is preferably 50 to 150 Kg/cm². Preferably, the graft composition of this invention having a large grafting rate is shaped at a high temperature and a low pressure. Subsequently, with continued pressing, the mold is gradually cooled by passing cold water, and when the temperature of the mold falls below 50° C., the mold is withdrawn from the press device and opened.

The shaped article so obtained is cut to a suitable size and thickness, and polished and processed on a bevel machine to form a contact lens.

Moreover, the graft composition of this invention can be fabricated into the form of artificial organs such as artificial blood vessels, artificial bones, artificial kidneys, artificial corneas or false teeth, or components of these organs. Further, same as in the case of the known cellulose-acrylic graft composition or starch-acrylic graft composition, the graft composition of this invention can be utilized as as excipient or carrier of pharmaceutically effective ingredients, a flocculating agent (or precipitating agent), or an adhesive.

The shaping means can be freely chosen. For example, there can be used a heat and press molding method, a melt extrusion method, an injection molding method, or a casting method.

The following Examples together with Comparative Examples illustrate the present invention more specifically.

The various properties shown in these Examples and Comparative Examples have been examined by the following methods.

1. Grafting rate

The grafting rate is expressed by the following equation.

$$\text{Grafting rate} = \frac{\text{Amount of monomer grafted}}{\text{Amount of dextran}} \times 100 \, (\%)$$

2. Method of isolating poly(alkyl methacrylate) from the graft composition and the measurement of its degree of polymerization:

a. Method of isolation

The graft composition is heated at 30° C. for 2 hours in 72% $H_2SO_4$. Water was added until the concentration of $H_2SO_4$ becomes 2%, and then it is boiled for 40 minutes. The solid is collected by filtration. It is then dissolved in acetone, and filtered. Methanol is added to the resulting filtrate to form a precipitate. The precipitate is dried in a vacuum drier held at 40° to 50° C.

b. Determination of the degree of polymerization

The poly (alkyl methacrylate) isolated and purified is dissolved in a solvent, and its intrinsic viscosity is measured using an Ostwald viscometer. Its molecular weight is calculated by using the following equation, and from the result, the degree of polymerization is computed.

$(\eta) = k \cdot M^\alpha$
$(\eta)$ intrinsic viscosity
$M$ molecular weight
$k$ and $\alpha$ constants as shown below Poly(methyl methacrylate)
$k = 0.96 \times 10^{-4}$
$\alpha = 0.69$
Solvent: acetone
Temperature: 25° C.

Poly(ethyl methacrylate)
$k = 0.283 \times 10^{-4}$
$\alpha = 0.79$
Solvent: methyl ethyl ketone
Temperature: 23° C.

Poly (n-butyl methacrylate)
$k = 0.99 \times 10^4$
$\alpha = 0.67$
Solvent: dioxane
Temperature: 25° C.

Poly (isobutyl methacrylate)
$k = 0.861^{-4}$
$\alpha = 0.70$
Solvent: methyl ethyl ketone
Temperature: 25° C.

From the molecular weight M obtained, the degree of polymerization [$m$ in formula (2)] is calculated on the basis of the following equation.

$m = M$/molecular weight of alkyl methacrylate monomer

3. Tensile strength, bending strength, contact angle, and water absorbtion:

a. Sample: a 1 mm thick sheet shaped by press at 200° C.

b. Tensile strength (Kg/cm²): A rectangular sample with a width of 12.7 mm is used and the tensile strength is measured using an Autograph IM 500. The test speed is 5 mm/min. and the testing temperature is 23° C. The interchuck distance is maintained at 50 mm.

c. Bending strength (Kg/mm²): Measured using an Autograph IM 500. The sample used is of 3 cm width, 1 mm thickness and 10 cm length. Both ends in the longitudinal direction of the sample are supported on a supporting stand with a span of 5 cm. A load is exerted on the center of the sample, and the load (Pkg) at breakage or the maximum load is measured. The bending strength is calculated from the following equation.

Figure 2:
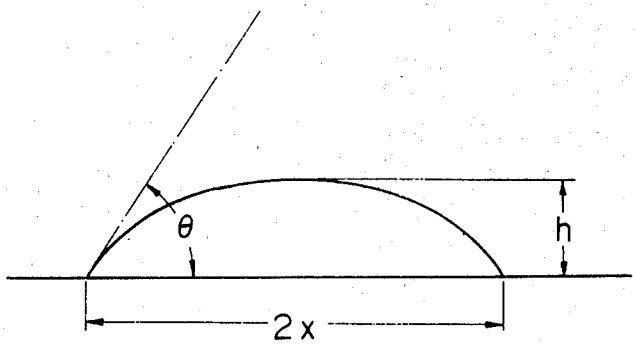

Bending strength = $2.5 \times P$ d. Contact Angle: Using a contact angle meter (contact angle measuring apparatus produced by Kyowa Kagaku Company), a certain water drop (about 0.02 ml.) is prepared by a microsyringe and is brought into contact with the surface of the sample carefully. After 30 seconds from the contact, the water drop is photographed, and $h$ and $x$ shown in FIG. 2 are measured. The contact angle ($\theta$) is calculated from the following equation. The measuring temperature is 20° C.

$\theta = 2 \tan^{-1} h/x$ e. Water absorbtion (%): A 25 × 7.5 mm sample is dried for 24 hours in air at 50° C., and then allowed to cool. After weighing, the sample is allowed to stand for 24 hours in distilled water at room temperature. The sample is then withdrawn from the water and wiped lightly with a cloth, and its weight is measured. The water absorption is determined from the difference in weights.

f. Vicat softening point: Using a needle penetrating softening point tester, a steel needle (surface area 1 mm$^2$) having a flat tip with a diameter of 1.13 mm is placed perpendicularly on the surface of a sample (surface area 1 cm$^2$, thickness 3 mm), and by exerting a load of 5 Kg on this needle, the temperature is raised at a rate of 50° C. per hour in a constant temperature vessel. When the needle penetrates into a sample to a depth of 1 mm, the temperature is measured.

g. Solubility: The solubility of a powdery sample (not fabricated) in water and acetone was measured at 25° C.

EXAMPLE 1

2 g of dextran having a weight average molecular weight of 60,000 ($n$=370) was dissolved in 55 ml. of water, and then 30 ml. of methyl methacrylate was added. With stirring, the air in the reaction vessel was fully replaced with nitrogen gas. To the solution were added 0.06 g of cerric ammonium nitrate and 15 ml. of 0.1 N nitric acid, and the mixture was reacted with stirring for 1 hour at 30° C. Then, 3.6 ml. of a 1% aqueous solution of hydroquinone was added to stop the reaction. The reaction mixture was poured into methanol to form a precipitate. The precipitate was washed thoroughly with hot water, centrifuged, and dried at 50° C. under reduced pressure.

The crude dextran-methyl methacrylate copolymer so obtained was placed in a Soxhlet extractor, and extracted for 30 hours continuously using acetone to afford 7.2 g of a purified dextran-methyl methacrylate copolymer. The grafting rate was 456 %, and the degree of polymerization of the poly (methyl methacrylate) in copolymer was 2,520.

The properties of the resulting product were compared with a cellulose (average molecular weight 30,000)/methyl methacrylate copolymer, a soluble starch (average molecular weight 100,000)/methyl methacrylate copolymer and a dextran/acrylic acid copolymer, and the results are shown in Table 2.

Table 2

| Samples | Tensile strength (Kg/cm$^2$) | Bending strength (Kg/mm$^2$) | Vicat softening point (° C) | Contact angle (°) | Water absorption (%) | Solubility in water | Solubility in acetone |
|---|---|---|---|---|---|---|---|
| Dextran-methyl methacrylate copolymer of Example 1 | 420 | 10.1 | 99 | 66 | 0.85 | Insoluble | Insoluble |
| Cellulose-methyl methacrylate copolymer *1 | 290 | 8.0 | 138 | 71 | 0.11 | Insoluble | Insoluble |
| Starch-methyl methacrylate copolymer *2 | 250 | 2.4 | 124.5 | 70 | 0.37 | Insoluble | Insoluble |
| Dextran-acrylic acid copolymer *3 | — | — | — | — | dissolved | Soluble | Insoluble |
| Dextran *4 | — | — | — | — | dissolved | Soluble | Insoluble |
| Poly(methyl methacrylate) *5 | 500 | 8.8 | 92 | 72 | 0.22 | Insoluble | Soluble |

*1 grafting rate = 405%, m = 1400
*2 grafting rate = 470%, m = 8,000
*3 grafting rate = 25%, n = 370
*4 Material of Example 1, n = 370
*5 Sample isolated from the copolymer obtained in Example 1, m = 2520

EXAMPLE 2

Examples 1 was repeated except that the starting dextran and the reaction conditions were varied as shown in Table 3 below. The yield, grafting rate, and the degree of polymerization of the poly(methylmethacrylate) in the resulting copolymers are shown in Table 3.

Table 3

| Run No. | n of formula (1) | Amount of dextran (g) | Amount of water (ml.) | Amount of methyl methacrylate (ml.) | Amount of cerium ammonian nitrate (g) | Amount of 0.1N HNO (ml.) | Reaction temperature (° C.) | Reaction time (hours) | Yield (g) | Grafting rate (%) | m of formula (2) |
|---|---|---|---|---|---|---|---|---|---|---|---|
| 1 | 370 | 2 | 55 | 7.5 | 0.19 | 15 | 60 | 3 | 2.4 | 110 | 1050 |
| 2 | 370 | 2 | 55 | 14 | 0.15 | 15 | 30 | 1 | 7.8 | 680 | 8100 |
| 3 | 370 | 2 | 55 | 30 | 0.15 | 15 | 30 | 2 | 15.5 | 1400 | 15500 |
| 4 | 55 | 2 | 55 | 7.5 | 0.15 | 15 | 25 | 2 | 2.3 | 259 | 460 |
| 5 | 1220 | 2 | 55 | 1.5 | 0.01 | 15 | 60 | 3 | 1.8 | 176 | 3300 |
| 6 | 3700 | 2 | 55 | 25 | 0.10 | 15 | 30 | 1 | 8.5 | 640 | 70000 |

EXAMPLE 3

The dextran/methyl methacrylate copolymer obtained in Example 1 was placed in a stainless steel mold, and preheated for 6 minutes by maintaining the inside temperature at 180° C. Then, the mold was pressed for 1 minute at 100 Kg/cm$^2$ gauge using a hydraulic press (26 tons, product of Toho Press Co., Ltd.), and then the mold was gradually cooled by passing cold water. When the temperature of the mold reacted 50° C., it was removed from the press, and opened.

The resulting plate was cut by a lathe rotating at a speed of 2,000 rpm. At the same rotating speed, the surface of the plate was rendered concave and convex to give a predetermined curvature. Then, it was fitted into a pit plate of a lens polishing machine, and polished at a rotating speed of 80 rpm at the lower part and 10 rpm at the upper part. Finally, the side surfaces of the lens are subjected to a bevel machine to produce a contact lens.

What is claimed is:

1. A contact lens consisting essentially of a graft copolymer composition which consists essentially of a dextran unit of the formula

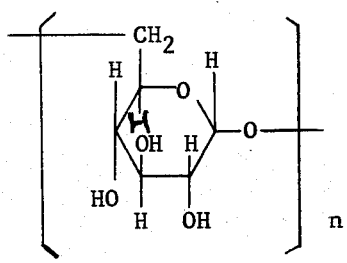

(1)

wherein $n$ is an integer of 5 to 150,000 and a poly(alkyl methacrylate) unit of the formula

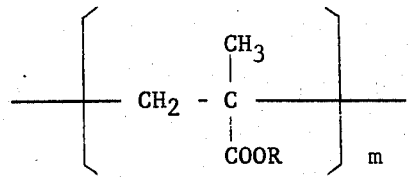

(2)

wherein $m$ is an integer of 50 to 20,000, R is an alkyl group having 1 to 4 carbons, and the ratio of formula (2) unit to formula (1) unit is 50 to 3000% by weight, with the proviso that the graft composition is water- and acetone- insoluble at 25° C., the composition having been heated to from about 170° to 230° C. under a pressure of about 50 to 150 kg/cm².

2. The contact lens molded article of claim 1 wherein the temperature is about 180° C. and the pressure is about 100 Kg/cm².

3. The contact lens molded article of claim 1 wherein the temperature is maintained for about six minutes, after which the pressure is applied for about one minute, while still maintaining the temperature.

4. The contact lens molded article of claim 1 wherein the graft composition is a dextran/methyl methacrylate copolymer.

5. An artificial cornea consisting essentially of a graft copolymer composition which consists essentially of a dextran unit of the formula

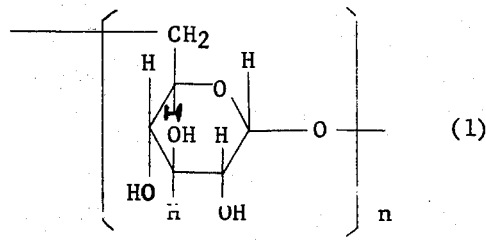

(1)

wherein $n$ is an integer of 5 to 150,000 and a poly(alkyl methacrylate) unit of the formula

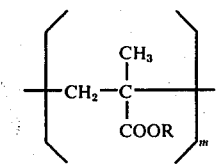

(2)

wherein $m$ is an integer of 50 to 20,000, R is an alkyl group having 1 to 4 carbons, and the ratio of formula (2) unit to formula (1) unit is 50 to 3000% by weight, with the proviso that the graft composition is water- and acetone insoluble at 25° C.

* * * * *